United States Patent
Takeuchi et al.

(10) Patent No.: US 9,851,127 B2
(45) Date of Patent: Dec. 26, 2017

(54) REFRIGERATION CYCLE DEVICE

(71) Applicant: DENSO CORPORATION, Kariya, Aichi-pref. (JP)

(72) Inventors: Masayuki Takeuchi, Nukata-gun (JP); Takashi Yamanaka, Kariya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 205 days.

(21) Appl. No.: 14/655,292

(22) PCT Filed: Nov. 18, 2013

(86) PCT No.: PCT/JP2013/006746
§ 371 (c)(1),
(2) Date: Jun. 24, 2015

(87) PCT Pub. No.: WO2014/103143
PCT Pub. Date: Jul. 3, 2014

(65) Prior Publication Data
US 2016/0010898 A1      Jan. 14, 2016

(30) Foreign Application Priority Data
Dec. 25, 2012   (JP) .................................. 2012-281284

(51) Int. Cl.
*F25B 7/00* (2006.01)
*B60H 1/00* (2006.01)
(Continued)

(52) U.S. Cl.
CPC ............ *F25B 7/00* (2013.01); *B60H 1/00278* (2013.01); *B60H 1/00342* (2013.01); *F25B 5/02* (2013.01);
(Continued)

(58) Field of Classification Search
CPC ............ B60H 1/00278; B60H 1/00342; B60H 2001/00307; F25B 7/00; F25B 40/02;
(Continued)

(56) References Cited

U.S. PATENT DOCUMENTS

2003/0080714 A1* 5/2003 Inoue ................. B60H 1/00278
320/150
2003/0218332 A1* 11/2003 Takasaki ................. F16L 13/08
285/123.3
(Continued)

FOREIGN PATENT DOCUMENTS

GB            2403791 A        1/2005
JP      2002313441 A   *  10/2002
(Continued)

OTHER PUBLICATIONS

International Search Report and Written Opinion (in Japanese with English Translation) for PCT/JP2013/006746, dated Jan. 28, 2014; ISA/JP.

*Primary Examiner* — Emmanuel Duke
(74) *Attorney, Agent, or Firm* — Harness, Dickey & Pierce, P.L.C.

(57) ABSTRACT

A first outward passage and a second outward passage are branched from a branch portion to guide refrigerants to a first evaporator and a second evaporator, respectively. In the second outward passage with a longer refrigerant flow path of the first and second outward passages, a second decompressor is disposed closer to the branch portion rather than the second evaporator in the second outward passage. Further, a part of the second outward passage located on the downstream side of the refrigerant flow with respect to the second decompressor is defined by an inner pipe of a double pipe, and a part of a second return passage is defined by an outer pipe of the double pipe.

16 Claims, 10 Drawing Sheets

(51) Int. Cl.
*F25B 5/02* (2006.01)
*F25B 40/02* (2006.01)

(52) U.S. Cl.
CPC .... *F25B 40/02* (2013.01); *B60H 2001/00307* (2013.01); *F25B 2400/0409* (2013.01); *F25B 2400/0411* (2013.01); *F25B 2400/23* (2013.01)

(58) Field of Classification Search
CPC ...... F25B 2004/0409; F25B 2400/0411; F25B 2400/23
See application file for complete search history.

(56) References Cited

U.S. PATENT DOCUMENTS

| | | |
|---|---|---|
| 2004/0069012 A1 | 4/2004 | Inoue |
| 2004/0261450 A1 | 12/2004 | Yoshino et al. |
| 2010/0206001 A1 | 8/2010 | Takahashi et al. |

FOREIGN PATENT DOCUMENTS

| | | |
|---|---|---|
| JP | 2003279180 A | 10/2003 |
| JP | 2004131034 A | 4/2004 |
| JP | 2004239318 A | 8/2004 |
| JP | 2005001449 A | 1/2005 |
| JP | 3949484 B2 | 7/2007 |
| WO | WO-2008023543 A1 | 2/2008 |

\* cited by examiner

SINGLE AIR COOLING OPERATION MODE

SINGLE BATTERY COOLING OPERATION MODE

BATTERY COOLING-AIR COOLING OPERATION MODE

REFRIGERATION CYCLE DEVICE

CROSS REFERENCE TO RELATED APPLICATIONS

This application is a U.S. National Phase Application under 35 U.S.C. 371 of International Application No. PCT/JP2013/006746 filed on Nov. 18, 2013 and published in Japanese as WO 2014/103143 A1 on Jul. 3, 2014. This application is based on and claims the benefit of priority from Japanese Patent Application 2012-281284 filed on Dec. 25, 2012. The entire disclosures of all of the above applications are incorporated herein by reference.

FIELD OF THE INVENTION

The present disclosure relates to a refrigeration cycle device that cools a plurality of objects to be cooled.

BACKGROUND ART

Conventionally, electric vehicles, including an electric automobile, and a hybrid vehicle, are designed to supply electric power stored in a secondary battery to an electric motor via an inverter or the like to thereby output a driving force for vehicle traveling. The secondary battery, typified by a lithium-ion battery, has its temperature increased by generation of Joule heat due to transfer of the electric power during traveling, charging, etc. If its temperature exceeds a predetermined temperature, the secondary battery might be degraded or broken. For this reason, a cooling device is required to maintain the battery at the predetermined temperature or less.

As the cooling device, a vapor compression refrigeration cycle that cools air for the interior to be blown into a vehicle interior is used, as disclosed in Patent Document 1. The refrigeration cycle device disclosed in Patent Document 1 includes a first evaporator that cools the air for the interior, and a second evaporator that cools the secondary battery. The first evaporator and the second evaporator are arranged in parallel to each other on the downstream side of a refrigerant flow through a radiator.

RELATED ART DOCUMENT

Patent Document

[Patent Document 1] Japanese Unexamined Patent Application Publication No. 2003-279180

SUMMARY OF INVENTION

The inventors of the present application have found through their studies that the use of the refrigeration cycle to cool the secondary battery might have the following problems, like the refrigeration cycle device disclosed in Patent Document 1.

In general, parts constituting the refrigeration cycle, such as a compressor and a radiator, are disposed in an engine room or bonnet of a front part of a vehicle. On the other hand, the secondary battery is disposed under a floor for passengers at the center of the vehicle, or under a rear seat or a trunk at the rear part of the vehicle so as to ensure its mounting space. That is, a refrigerant pipe connected to the second evaporator includes an outward refrigerant pipe from a branch portion on the downstream side of a refrigerant flow through the radiator to the second evaporator, as well as a return refrigerant pipe from the second evaporator to a merging portion on the upstream side of a refrigerant flow through a blower. Thus, the refrigerant pipe connected to the second evaporator is longer than that of a refrigerant pipe connected to the first evaporator. The length of the refrigerant pipe connected to the second evaporator is approximately 5 m each way, depending on the position of arrangement of the second evaporator.

In the refrigeration cycle device disclosed in Patent Document 1, during cooling the secondary battery, a high-density liquid refrigerant flowing out of the radiator passes through the above-mentioned long outward refrigerant pipe, followed by being decompressed by a decompressor disposed near the second evaporator, and then flows into the second evaporator.

As mentioned above, since the outward refrigerant pipe of the second evaporator is long, an internal volume of the outward refrigerant pipe is large, so that a large amount of the high-density liquid refrigerant exists in the outward refrigerant pipe. Thus, the refrigerant cycle device disclosed in Patent Document 1 significantly increases the amount of refrigerant sealed in the entire refrigerant cycle, as compared to a refrigeration cycle device with only a first evaporator. For example, a required refrigerant amount will largely differ every operation mode, such as a single air cooling operation using the first evaporator, or a single battery cooling operation using the second evaporator. The increase in the amount of sealed refrigerant leads to an increase in refrigerant cost. The large difference in required refrigerant amount might result in an increase in volume of a device storing the excessive refrigerant in the cycle.

In the description above, the first evaporator serves to cool the air for the interior, and the second evaporator cools the secondary battery, although this is not only the case. Alternatively, a case in which the first evaporator cools a first object to be cooled and the second evaporator cools a second object to be cooled might have such a problem.

The present disclosure has been made in view of the foregoing matters, and it is an object of the present disclosure to provide a refrigeration cycle device that can decrease the amount of sealed refrigerant in the entire refrigeration cycle and also can reduce a difference in required refrigerant amount between its operation modes.

A refrigeration cycle device of the present disclosure includes: a compressor that compresses and discharges a refrigerant; a radiator that dissipates heat from the refrigerant discharged from the compressor; a first decompressor and a second decompressor that are arranged in parallel on a downstream side of the radiator in a refrigerant flow, the first and second decompressors being adapted to decompress the refrigerant flowing out of the radiator; a first evaporator that exchanges heat between the refrigerant decompressed by the first decompressor and a first object to be cooled, to cool the first object to be cooled and to evaporate the refrigerant; a second evaporator that exchanges heat between the refrigerant decompressed by the second decompressor and a second object to be cooled, to cool the second object to be cooled and to evaporate the refrigerant; a first outward passage and a second outward passage which are refrigerant flow paths branched from a branch portion provided on the downstream side of the refrigerant flow through the radiator, and which are adapted to guide the refrigerants from the branch portion to refrigerant inlets of the first evaporator and the second evaporator, respectively; and a first return passage and a second return passage which are refrigerant flow paths merging at a merging portion provided on an upstream side of a refrigerant flow through the compressor, and which are adapted to guide the refrigerants from refrigerant outlets of the first evaporator and the second evaporator, respectively, to the merging portion.

The second outward passage has a refrigerant flow path longer than that of the first outward passage. Furthermore, a part of the second outward passage, located on a downstream side of a refrigerant flow with respect to the second decompressor, is defined by an inner pipe of a double pipe and an outer pipe covering the inner pipe, and at least a part of the second return passage is defined by the outer pipe. In addition, the second decompressor is provided in the second outward passage on a side of the branch portion with respect to the double pipe.

Here, the phrases "heat exchange between the refrigerant and the first object to be cooled" and "heat exchange between the refrigerant and the second object to be cooled" as used mean not only the direct heat exchanger, but also indirect heat exchanger via a heat medium.

According to the present disclosure, the second decompressor is disposed on a side of the branch portion in the second outward passage. Thus, a section of the second outward passage through which a liquid refrigerant having a high density flows becomes short, and a section through which a gas-liquid two-phase refrigerant having a low density and decompressed by the second decompressor flows becomes long, as compared to the case in which the second decompressor is disposed on a side of the second evaporator in the second outward passage. Therefore, the amount of refrigerant existing in the second outward passage can be reduced. According to the present disclosure, the sealed refrigerant amount in the entire refrigeration cycle can be decreased, and a difference in required refrigerant amount between the respective operation modes can also be reduced.

Further, according to the present disclosure, the section of the second outward passage through which the gas-liquid two-phase refrigerant flows is constituted by the inner pipe of the double pipe, and the second return passage is constituted by the outer pipe of the double pipe. Thus, the refrigerant flowing through the outer pipe serves as a heat insulator, which can suppress the reception of heat by the gas-liquid two-phase refrigerant flowing through the second outward passage from the outside, as compared to the case in which the second outward passage is constituted by the single pipe. As a result, the present disclosure can improve the cooling performance of the second evaporator as compared to the case in which the second outward passage is constituted by the single pipe.

Alternatively, in the refrigeration cycle device of the present disclosure, in the operation mode of allowing the refrigerant to flow through both the first and second evaporators, a flow-path sectional area of the outer pipe may be smaller than a flow-path sectional area of the inner pipe in at least a part of the double pipe such that a refrigerant pressure at the refrigerant outlet of the second evaporator is higher than that at the refrigerant outlet of the first evaporator.

Thus, in the operation mode of allowing the refrigerant to flow through both the first and second evaporators, a pressure loss in the second return passage becomes large, so that the refrigerant pressure on the second evaporator side can be kept higher than that on the first evaporator side. If the refrigerant temperature of the second evaporator is intended to be higher than that of the first evaporator, the above temperature relationship can be achieved by adding a decompressor, such as a fixed throttle, to the second return passage. However, the present disclosure can achieve the temperature relationship without adding the decompressor in the second return passage.

DESCRIPTION OF EMBODIMENTS

Figure 1:
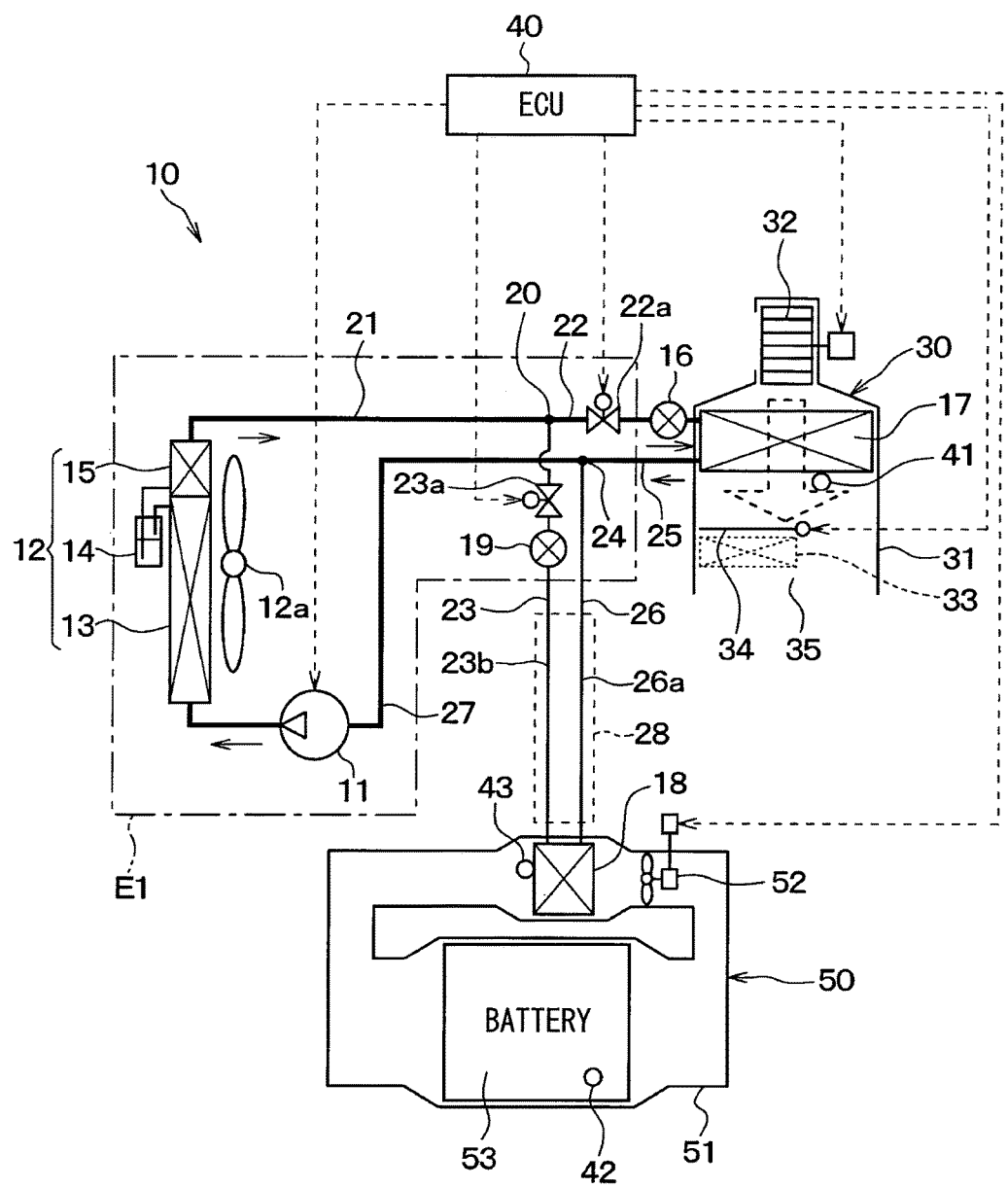
FIG. 1 is an entire configuration diagram showing a refrigerant flow in a single air cooling operation mode of the refrigeration cycle device in a first embodiment.

In the following, preferred embodiments of the present invention will be described with reference to the accompanying drawings. The same or equivalent parts in the embodiments below are indicated by the same reference characters.

First Embodiment

Figure 2:
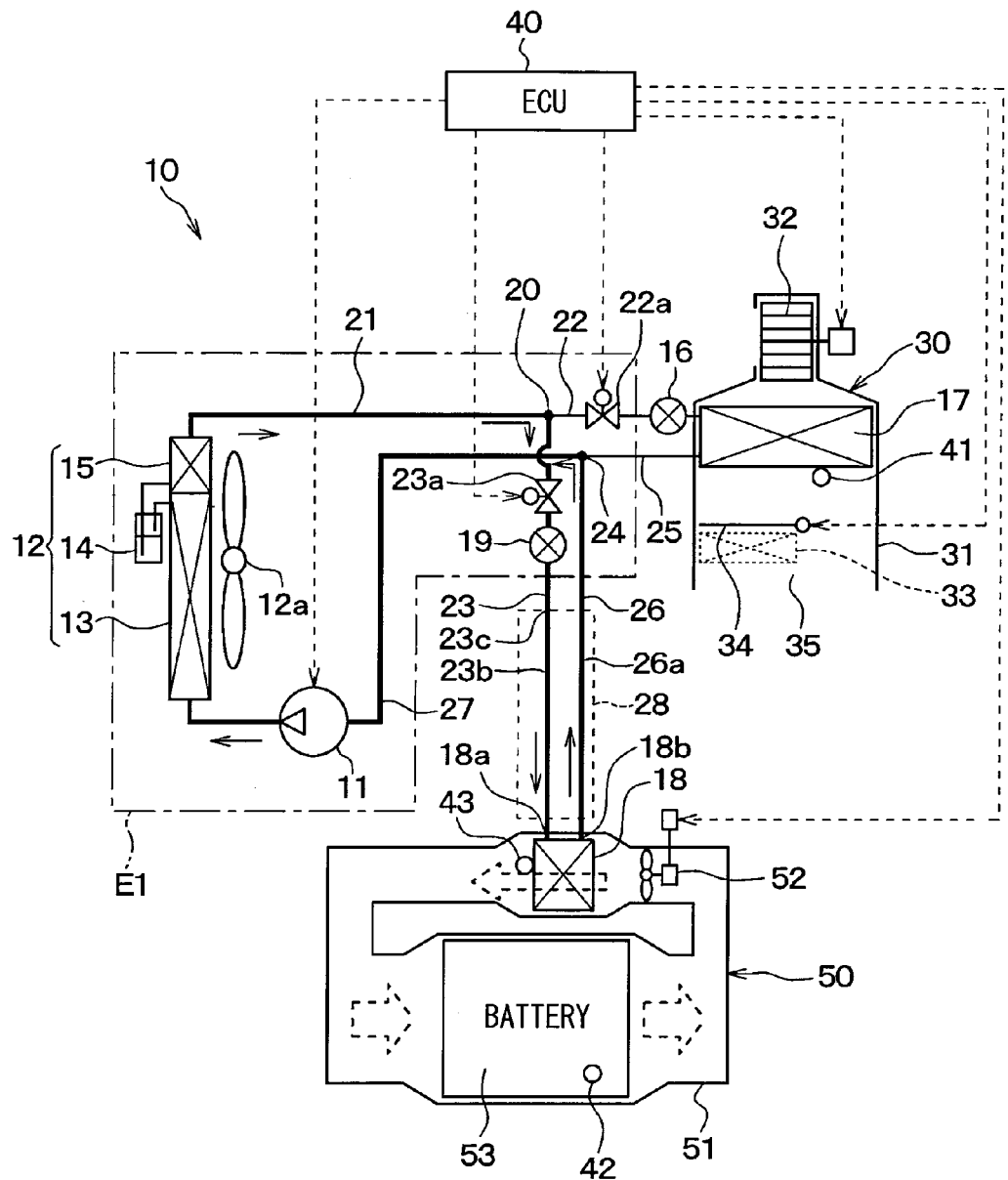
FIG. 2 is an entire configuration diagram showing a refrigerant flow in a single battery cooling operation mode of the refrigeration cycle device in the first embodiment.
Figure 3:
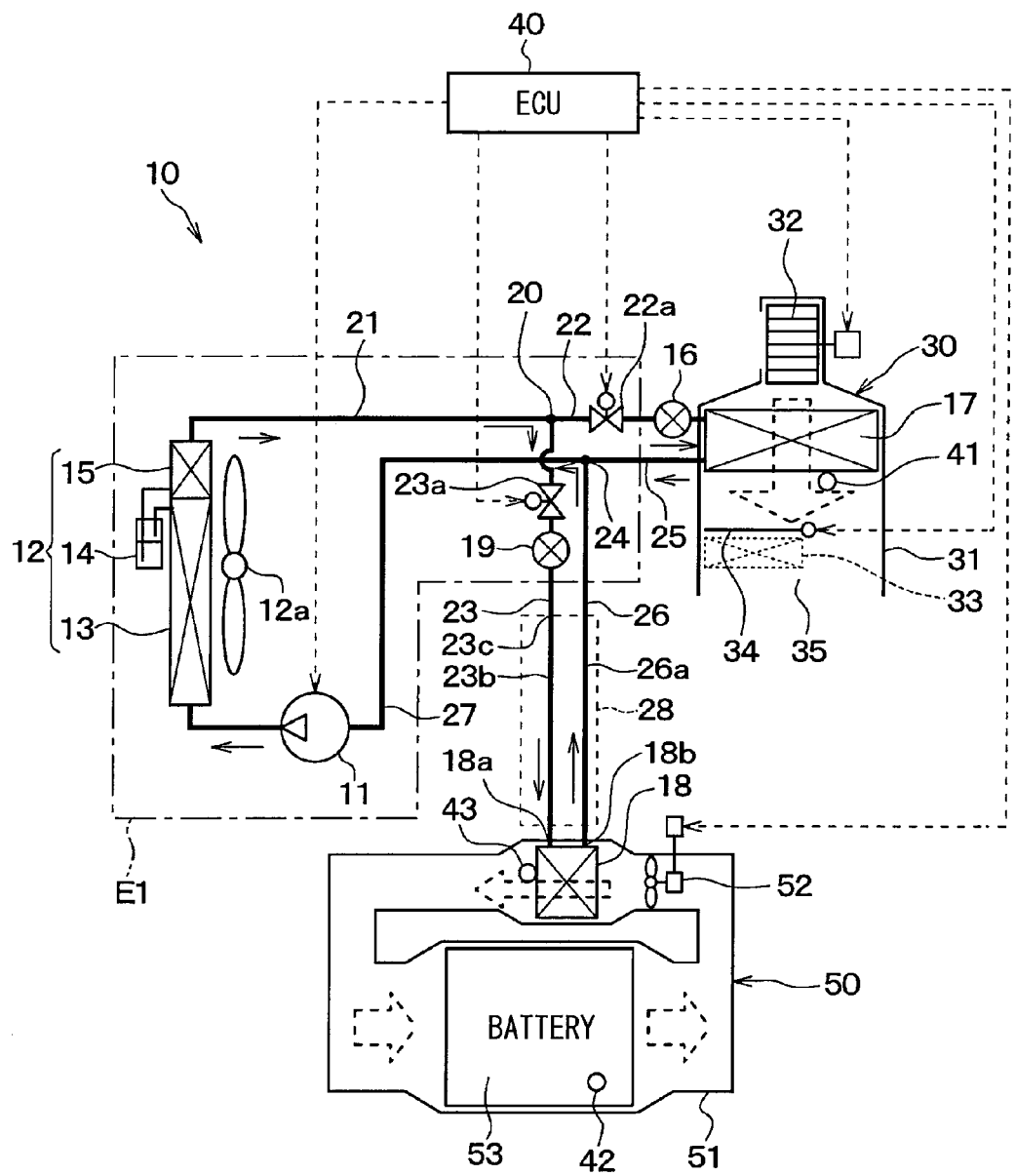
FIG. 3 is an entire configuration diagram showing a refrigerant flow in a battery cooling-air cooling operation mode of the refrigeration cycle device in the first embodiment.

In a first embodiment, a refrigeration cycle device 10 according to the present disclosure is applied to a hybrid vehicle that can obtain a driving force for vehicle traveling from both an electric motor for traveling and an internal combustion engine. As shown in FIGS. 1 to 3, the hybrid vehicle uses the refrigeration cycle device 10 to cool the vehicle interior and also to cool a secondary battery 53 that stores therein electric power to be supplied to the electric motor for traveling.

The refrigeration cycle device 10 has a structure that includes a receiver cycle for air conditioning as a basic cycle, to which a secondary battery cooling function is added. The basic cycle has various devices, including a compressor 11, an exterior condenser 12, an air-cooling expansion valve 16, and an interior evaporator 17. These respective devices are connected together by refrigerant pipes. In the basic cycle, a battery-cooling evaporator 18 is disposed in parallel to the interior evaporator 17 on the downstream side of the refrigerant flow of the exterior condenser 12, and a battery-cooling expansion valve 19 is disposed on the upstream side of the refrigerant flow of the battery-cooling evaporator 18.

In the present disclosure, the exterior condenser 12 corresponds to a radiator, the air-cooling expansion valve 16 corresponds to a first decompressor, the interior evaporator 17 corresponds to a first evaporator, the battery-cooling expansion valve 19 corresponds to a second decompressor, and the battery-cooling evaporator 18 corresponds to a second evaporator. The air for the interior to be blown into the vehicle interior is a first object to be cooled, and the secondary battery 53 is a second object to be cooled.

The refrigeration cycle device 10 employs a hydrofluorocarbon (HFC) refrigerant or the like as the refrigerant, and forms a vapor compression type subcritical refrigeration cycle whose high-pressure side refrigerant pressure does not exceed the critical pressure of the refrigerant.

Now, the refrigeration cycle device 10 will be described in detail below.

The compressor 11 is to suck, compress, and discharge the refrigerant in the refrigeration cycle device 10. The compressor 11 is configured as an electric compressor which rotatably drives a fixed displacement compression mechanism having a fixed discharge capacity by use of an electric motor. The electric motor of the compressor 11 has its number of revolutions controlled by a control signal output from a controller 40 to be described later. A discharge port side of the compressor 11 is coupled to a refrigerant inlet side of the exterior condenser 12.

The exterior condenser 12 acts as a radiator that exchanges heat between the refrigerant circulating therethrough and outside air blown from a blower fan 12a, thereby dissipating heat from the refrigerant discharged from the compressor to condense the refrigerant. More specifically, the exterior condenser 12 is the so-called subcool condenser, which includes a condensing portion 13, a gas-liquid separator 14, and a supercooling portion 15. The condensing portion 13 exchanges heat between the gas-phase refrigerant discharged from the compressor 11 and air to thereby condense the refrigerant. The gas-liquid separator 14 separates the refrigerant flowing out of the condensing portion 13 into gas and liquid phase refrigerants. The supercooling portion 15 cools the liquid refrigerant flowing out of the gas-liquid separator 14.

The refrigeration cycle device 10 includes a first outward passage 22 and a second outward passage 23. The first outward passage 22 includes a refrigerant flow path 21 guiding the refrigerant flowing out of the exterior condenser 12 to a branch portion 20, and a refrigerant flow path branched from the branch portion 20, and guiding the refrigerant from the branch portion 20 to a refrigerant inlet of the interior evaporator 17. The second outward passage 23 guides the refrigerant to the refrigerant inlet of the battery-cooling evaporator 18 from the branch portion 20.

The refrigeration cycle device 10 further includes a first return passage 25, a second return passage 26, and a refrigerant flow path 27. The first return passage 25 is a refrigerant flow path that is merged with a merging portion 24. The first return passage 25 guides the refrigerant flowing out of a refrigerant outlet of the interior evaporator 17 to the merging portion 24. The second return passage 26 guides the refrigerant flowing out of a refrigerant outlet of the battery-cooling evaporator 18 to the merging portion 24. The refrigerant flow path 27 guides the refrigerant from the merging portion 24 to the suction side of the compressor 11.

The first outward passage 22 is provided with a first opening/closing valve 22a and the air-cooling expansion valve 16.

The first opening/closing valve 22a is an electromagnetic valve whose opening and closing operations are controlled by a control voltage output from the controller 40. Switching between the presence and absence of the refrigerant flow in the first outward passage 22 is performed by opening or closing the first opening/closing valve 22a. Thus, the first opening/closing valve 22a constitutes the refrigerant flow path switch.

The air-cooling expansion valve 16 is a decompressor that decompresses the refrigerant flowing out of the exterior condenser 12 into the interior evaporator 17. The air-cooling expansion valve 16 is a mechanical expansion valve which adjusts its valve opening degree such that a superheat degree of the refrigerant flowing out of the interior evaporator 17 is controlled to be a predetermined value, e.g., 5° C.

The interior evaporator 17 is a heat exchanger that exchanges heat between the refrigerant decompressed by the air-cooling expansion valve 16 and the air for the interior to thereby cool the air for the interior, while evaporating the refrigerant. The interior evaporator 17 is disposed on the upstream side of the air flow with respect to a heater core 33 within a casing 31 of an interior air conditioning unit 30.

The second outward passage 23 is provided with a second opening/closing valve 23a and the battery-cooling expansion valve 19.

The second opening/closing valve 23a is an electromagnetic valve, like the first opening/closing valve 22a. Switching between the presence and absence of the refrigerant flow in the second outward passage 23 is performed by opening or closing the second opening/closing valve 23a. Thus, the second opening/closing valve 23a constitutes the refrigerant flow path switch.

The battery-cooling expansion valve 19 is a decompressor that decompresses the refrigerant to flow into the battery-cooling evaporator 18. The battery-cooling expansion valve 19 is a mechanical expansion valve which adjusts its valve opening degree such that a superheat degree of the refrigerant flowing out of the battery-cooling evaporator 18 and then passing through an outer pipe 28b of a double pipe 28 to be described later is controlled to be a predetermined value, e.g., 5° C.

The battery-cooling evaporator 18 is disposed in a battery pack 50 that forms an air passage for a battery air to be blown into the secondary battery 53. The battery-cooling evaporator 18 is a heat exchanger that exchanges heat between the refrigerant decompressed by the battery-cooling expansion valve 19 and the battery air to thereby cool the battery air, while evaporating the refrigerant. In short, the battery-cooling evaporator 18 is a heat exchanger that indirectly exchanges heat between the refrigerant and the secondary battery 53 via the battery air.

The above-mentioned compressor 11, exterior condenser 12, battery-cooling expansion valve 19, branch portion 20, first opening/closing valve 22a, second opening/closing valve 23a, and merging portion 24 are disposed in an engine room E1 at the front part of the vehicle. The air-cooling expansion valve 16 and the interior evaporator 17 are disposed at the foremost part of a vehicle compartment. The battery-cooling evaporator 18 is disposed at a rear part of the vehicle, and spaced apart from the engine room E1 as compared to the interior evaporator 17. Thus, the second outward passage 23 has a refrigerant flow path longer than that of the first outward passage 22, and likewise, the second return passage 26 has a refrigerant flow path longer than that of the first return passage 25.

The battery-cooling expansion valve 19 is disposed in the vicinity of the branch portion 20, that is, is disposed on a side closer to the branch portion 20 rather than the battery-cooling evaporator 18 in the second outward passage 23. Note that the position of the battery-cooling expansion valve 19 is not limited to the vicinity of the branch portion 20. Alternatively, the battery-cooling expansion valve 19 may be disposed on a side of the branch portion 20 rather than the center of the second outward passage 23.

Figure 4:
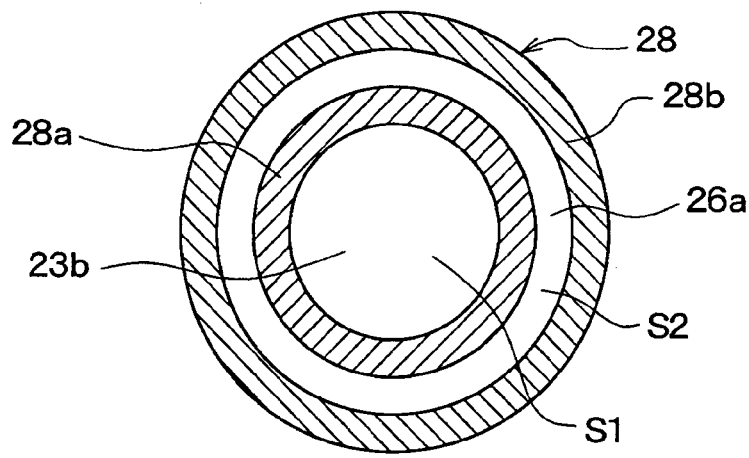
FIG. 4 is a cross-sectional view of a double pipe shown in FIGS. 1 to 3.
Figure 5:
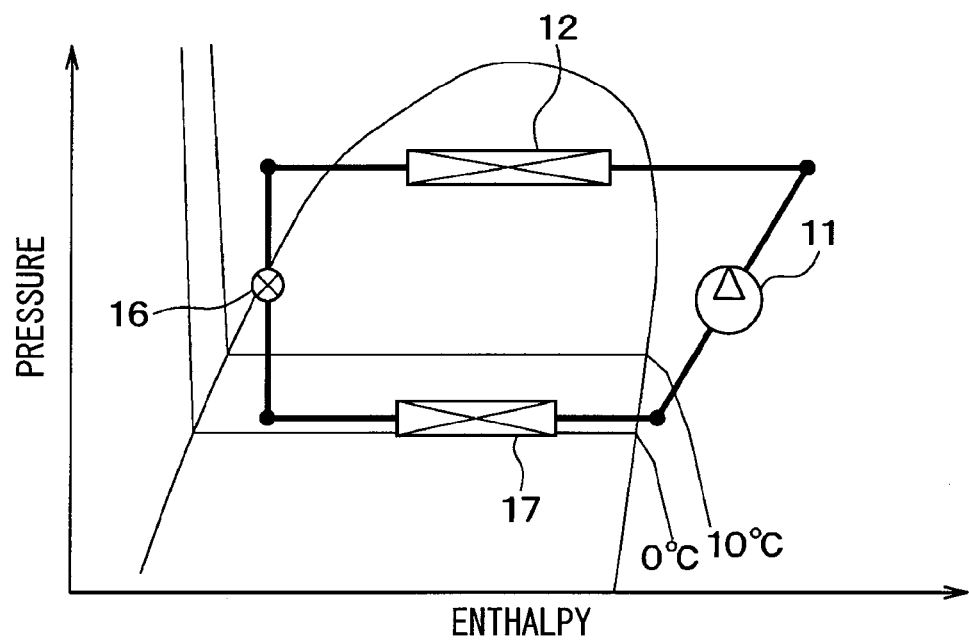
FIG. 5 is a Mollier chart showing the state of refrigerant in the single air cooling operation mode of the refrigeration cycle device in the first embodiment.

A part 23b of the second outward passage 23 on the downstream side of the refrigerant flow with respect to the battery-cooling expansion valve 19 is constituted by an inner pipe 28a of the double pipe 28 shown in FIG. 4. A part 26a of the second return passage 26 is constituted by the outer pipe 28b of the double pipe 28 shown in FIG. 4. The double pipe 28 includes the inner pipe 28a and the outer pipe 28b covering the inner pipe. Most part of the double pipe 28 is disposed outside the vehicle compartment under the floor of the vehicle while being covered with a cover or the like, or exposed to the outside.

The double pipe 28 used is one that includes the inner pipe 28a positioned inside the outer pipe 28b, and in which the outer diameter of the inner pipe 28a is smaller than an inner diameter of the outer pipe 28b. In the double pipe 28, a refrigerant flow path of the outer pipe 28b is formed between the outer surface of the inner pipe 28a and the inner surface of the outer pipe 28b, and extends in the same direction as an extending direction of the inner pipe 28a.

As will be described later, the inner pipe 28a allows the gas-liquid two-phase refrigerant to flow therethrough, and the inner diameter of the inner pipe 28a is set to 10.3 mm, which is the same as that of a general gas refrigerant pipe. Note that an outward pipe of a general evaporator permits the liquid refrigerant to flow therethrough, and its inner diameter of the outward pipe is approximately 6 mm.

Further, in the entire double pipe 28, a flow path sectional area S2 of the outer pipe 28b is set smaller than a flow path sectional area S1 of the inner pipe 28a (S1>S2).

Now, the interior air conditioning unit 30 will be described below. The interior air conditioning unit 30 is to blow out the air for the interior whose temperature is adjusted, into the vehicle compartment. The interior air conditioning unit 30 is disposed inside a gauge board (instrument panel) at the forefront of the vehicle compartment. The interior air conditioning unit 30 is configured by accommodating a blower 32, the above-mentioned interior evaporator 17, the heater core 33, and the like, in the casing 31 forming an outer envelope.

The casing 31 is made of resin, and forms therein an air passage of air for the interior. An inside/outside air switch (not shown) that switches between the air (inside air) in the vehicle interior and the outside air to introduce the selected one is disposed on the most upstream side of the air flow in the casing 31.

The blower 32 is to blow out the air sucked via the inside/outside air switch, into the vehicle interior. The blower 32 is an electric blower that drives a centrifugal multi-blade fan by an electric motor. The blower 32 has the number of revolutions (i.e., air blowing volume) controlled by a control voltage output from the controller 40.

The interior evaporator 17 and heater core 33 are disposed on the downstream side of the air flow from the blower 32 in that order with respect to the flow of the air for the interior.

The heater core 33 is a heating heat exchanger that heats the air for the interior using a coolant of the internal combustion engine as a heat source.

An air mix door 34 is disposed on the downstream side of the air flow in the interior evaporator 17 and on the upstream side of the air flow through the heater core 33. The air mix door 34 adjusts the rate of the volume of the air passing through the heater core 33 among the air having passed through the interior evaporator 17. The air mix door 34 is driven by a control signal output from the controller 40.

A mixing space 35 is provided on the downstream side of the air flow in the heater core 33 so as to mix the air heated by exchanging heat with the refrigerant in the heater core 33, with the air not heated while bypassing the heater core 33.

Blowout openings that blow out the conditioned air mixed in the mixing space 35, into the vehicle interior as a space to be air-conditioned are disposed on the most downstream side of the air flow in the casing 31. Specifically, the blowout openings include a face blowout opening that blows the conditioned air toward the upper body of a passenger in the vehicle compartment, a foot blowout opening that blows the conditioned air toward the feet of the passenger, and a defroster blowout opening that blows the conditioned air toward the inner side of a windshield glass of the vehicle (which openings are not shown).

Thus, the air mix door 34 adjusts the rate of the volume of air passing through the heater core 33 to adjust the temperature of conditioned air mixed in the mixing space 35, thus controlling the temperature of the conditioned air blown from each blowout opening.

A face door, a foot door, and a defroster door (not shown) are arranged on the upstream sides of the air flows through the face blowout opening, the foot blowout opening, and the defroster blowout opening, respectively. The face door adjusts an opening area of the face blowout opening. The foot door adjusts an opening area of the foot blowout opening. The defroster door adjusts an opening area of the defroster blowout opening.

Next, the battery pack 50 will be described below. The battery pack 50 is disposed on a side of the bottom surface of the vehicle located between a trunk room and a rear seat on the rear side of the vehicle. The battery pack 50 forms an air passage which circulates and blows the battery air within a metal casing 51 subjected to an electrically insulating process (for example, coated with an insulating material). The battery pack 50 accommodates a blower 52, the battery-cooling evaporator 18, the secondary battery 53, and the like in the air passage.

The blower 52 is an electric blower that is disposed on the upstream side of the air flow through the battery-cooling evaporator 18, and which is adapted to blow the battery air toward the battery-cooling evaporator 18. The number of revolutions of the blower 52 (volume of blown air) is controlled by a control voltage output from the controller 40. Further, the secondary battery 53 is disposed on the downstream side of the air flow through the battery-cooling evaporator 18. The downstream side of the air flow through the secondary battery 53 communicates with the suction port side of the blower 52.

Thus, once the blower 52 is operated, the battery air cooled by the battery-cooling evaporator 18 is blown onto the secondary battery 53, thereby cooling the secondary battery 53. Then, the battery air that cools the secondary battery 53 is sucked into the blower 52 and then blown again toward the battery-cooling evaporator 18.

Next, an electric controller will be described below. The controller 40 is comprised of a known microcomputer, including CPU, ROM, and RAM, and a peripheral circuit thereof. The controller 40 performs various kinds of computations and processing based on control programs stored in the ROM to thereby control the operations of various devices to be controlled that are connected to its output side.

A group of various sensors for control is connected to the input side of the controller 40. The sensors include an inside air sensor that detects a temperature of the vehicle interior, an outside air sensor that detects a temperature of the outside air, a solar radiation sensor that detects an amount of solar radiation in the vehicle interior, and a first evaporator temperature sensor 41 that detects a temperature of blown air (evaporator temperature) from the interior evaporator 17. The sensors also include an air heating blowout temperature sensor that detects the blown air temperature of the heater core 33, a battery temperature sensor 42 that directly detects the temperature of the secondary battery 53, and a second evaporator temperature sensor 43 that detects the blown air temperature of the battery-cooling evaporator.

An operation panel (not shown) is disposed near an instrument board at the front of the vehicle compartment, and coupled to the input side of the controller 40. Operation signals are input from various types of operation switches provided on the operation panel. Various operation switches provided on the operation panel include an air-conditioning operation switch for requesting air conditioning of a vehicle interior, a vehicle interior temperature setting switch for setting a vehicle interior temperature, a selection switch for an air-conditioning operation mode, and the like.

The controller 40 incorporates therein a control unit that controls various types of devices to be controlled, which are connected to the output side thereof. The structure (hardware and software) that controls the operation of each of the devices to be controlled configures the control unit that controls the operation of the corresponding device to be controlled. For example, in the controller 40, the structure (hardware and software) that controls the operation of the compressor 11 constitutes a refrigerant discharge capacity control portion, and the structure that controls the operation of each of various devices serving as the refrigerant flow path switching portion constitutes a refrigerant flow-path switch control portion.

Next, the operation of the refrigeration cycle device 10 with the above-mentioned structure will be described below. As mentioned above, the refrigeration cycle device 10 can perform air cooling of the vehicle interior, and cooling of the secondary battery 53. The air heating of the vehicle interior is performed by the heater core 33.

Switching of the operation mode between the air cooling mode of cooling the vehicle interior, and the air heating mode of heating the vehicle interior is performed by causing the controller 40 to execute a control program pre-stored in a storage circuit.

The control program is executed to repeat a control routine. The control routine involves reading an operation signal from the operation panel and detection signals from a group of sensors for control, determining the control state of each of various devices to be controlled based on the detection signals and operation signal read, and outputting a control signal or control voltage to each control device to be controlled so as to obtain the determined control state.

As to the operation mode of air conditioning of the vehicle interior, in reading the operation signal from the operation panel, the operation mode is switched to the air cooling mode when air cooling is selected by the selection switch with an air-conditioning operation switch turned on (ON). On the other hand, the operation mode is switched to the air heating mode when air heating is selected by the selection switch with the air-conditioning operation switch turned on (ON).

A battery cooling operation mode of cooling the secondary battery 53 is performed when a battery temperature is higher than a predetermined temperature, or when an air temperature within the battery pack is higher than a predetermined temperature in reading a detection signal from the control sensor group.

Now, a description will be given of the operations of the above-mentioned main operation modes.

(a) Single Air Cooling Operation Mode

The single air cooling operation mode is an operation mode of performing air cooling of the vehicle interior by allowing the refrigerant to flow only through the interior evaporator 17 of the interior evaporator 17 and the battery-cooling evaporator 18, without cooling the secondary battery 53. The operation mode is performed, for example, with an operation switch of the operation panel turned on (ON) when air cooling is selected by the selection switch, and the battery temperature is lower than the predetermined temperature.

In the operation mode, the controller 40 opens the first opening/closing valve 22a, and closes the second opening/closing valve 23a. In this way, the refrigeration cycle device 10 performs switching to a refrigerant circuit that allows the refrigerant to flow therethrough as indicated by thick lines and solid arrows of FIG. 1.

The controller 40 calculates a target air temperature TAO which is a target temperature of air to be blown into the vehicle interior, based on values of the detection signal and operation signal read. Further, the controller 40 determines the operating state of each of various devices to be controlled (control signal to be output to each of various devices to be controlled) that are connected to the output side of the controller 40, based on the calculated target air temperature TAO and the detection signal from the sensor group.

For example, the refrigerant discharge capacity of the compressor 11, that is, the control signal to be output to the electric motor of the compressor 11 is determined in the following way. A target evaporator outlet air temperature TEO of the interior evaporator 17 is determined based on the target air temperature TAO with reference to the control map pre-stored in the controller 40. A control signal to be output to the electric motor of the compressor 11 is determined based on the detection result obtained by an evaporator temperature sensor 41 such that a temperature of air blown from the interior evaporator 17 approaches the target evaporator outlet air temperature TEO. In general, the air cooling is required to have a large cooling capacity of 1 to 5 kW. In order to ensure the air cooling performance and the dehumidification performance, the blown air temperature of the interior evaporator 17 needs to be about 1° C. The number of revolutions of the compressor 11 is determined such that the blown air temperature of the interior evaporator 17 is about 1° C.

The control voltage to be output to the electric motor of the blower 32 in the interior air conditioning unit 30 is determined based on the target air temperature TAO with reference to a control map pre-stored in the storage circuit. The control signal to be output to a driving portion of the air mix door 34 is determined such that the air mix door 34 closes an air passage of the heater core 33, and that the whole air having passed through the interior evaporator 17 bypasses the heater core 33.

The blower 52 of the battery pack 50 is stopped. When cooling the secondary battery 53 only by ventilation air, the blower 52 may be operated.

Then, the control signal or control voltage is output from the controller 40 to the device to be controlled so as to obtain the control state determined in the way described above.

Thus, in the refrigeration cycle device 10 of the single air cooling operation mode, as shown in FIGS. 1 to 5, the refrigerant flows from the compressor 11 to the exterior condenser 12, the air-cooling expansion valve 16, the interior evaporator 17, and then the compressor 11 in this order.

At this time, in the interior evaporator 17, the refrigerant decompressed by the air-cooling expansion valve 16 absorbs heat from the air for the interior blown from the blower 32 to evaporate itself. In this way, the air for the interior is cooled, thereby achieving the air cooling of the vehicle interior.

(b) Single Battery Cooling Operation Mode

The single battery cooling operation mode is an operation mode of singly cooling the secondary battery 53 by allowing the refrigerant to flow only through the battery-cooling evaporator 18 of the interior evaporator 17 and the battery-cooling evaporator 18, without air-conditioning of the vehicle interior. The operation mode is performed, for example, with the operation switch of the operation panel turned off (OFF) when the battery temperature is higher than the predetermined temperature.

In the operation mode, the controller 40 closes the first opening/closing valve 22a, and opens the second opening/closing valve 23a. Thus, the refrigeration cycle device 10 performs switching to a refrigerant circuit that allows the refrigerant to flow therethrough as indicated by thick lines and solid arrows of FIG. 2.

With the refrigerant circuit structure described above, the controller 40 determines the operating states of the respective various devices to be controlled connected to the output side of the controller 40 based on the detection signal from the sensor group.

The refrigerant discharge capacity of the compressor 11 is controlled according to a battery-cooling required capacity calculated based on the detection temperature from the battery temperature sensor 42 or the second evaporator temperature sensor 43. An amount of heat generation from the battery during traveling is very small, e.g., approximately several hundreds of W, and thus is approximately 2 kW or the like even upon quick charge that generates the maximum heat amount. Thus, the battery-cooling required capacity is smaller than the air cooling capacity. The number of revolutions of the compressor 11 is determined such that the blown air temperature of the battery-cooling evaporator 18 detected by the second evaporator temperature sensor 43 is higher than that of the interior evaporator 17.

Since the control signal to be output to the blower 32 of the interior air conditioning unit 30 indicates the air cooling is unnecessary, the blower 32 is stopped. When ventilating only the vehicle interior, the blower 32 may be operated.

The control signal to be output to the blower 52 of the battery pack 50 is determined such that a blowing capacity of the blower 52 is a predetermined blowing capacity.

Then, the control signal or control voltage is output from the controller 40 to the device to be controlled so as to obtain the control state determined in the way described above.

Figure 6:
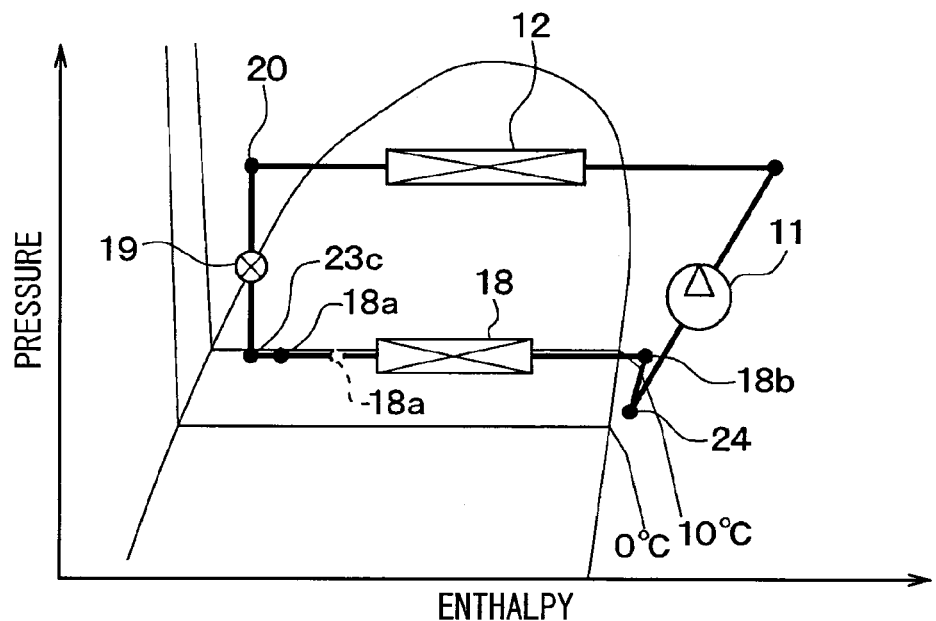
FIG. 6 is a Mollier chart showing the state of refrigerant in the single battery cooling operation mode of the refrigeration cycle device in the first embodiment.

Thus, in the refrigeration cycle device 10 of the single battery cooling operation mode, as shown in FIGS. 2 and 6, the refrigerant flows from the compressor 11 to the exterior condenser 12, the branch portion 20, the battery-cooling expansion valve 19, the inner pipe 28a of the double pipe 28 (see FIG. 4), the battery-cooling evaporator 18, the outer pipe 28b of the double pipe 28 (see FIG. 4), the merging portion 24, and then the compressor 11 in this order.

At this time, the refrigerant flowing out of the exterior condenser 12 is decompressed by the battery-cooling expansion valve 19 into a gas-liquid two-phase refrigerant. The refrigerant in this state flows through the inner pipe 28a of the double pipe 28, and then flows into the battery-cooling evaporator 18. The refrigerant flowing into the battery-cooling evaporator 18 absorbs heat from the battery air blown from the blower 52 to evaporate itself. In this way, the battery air is cooled, whereby the secondary battery 53 is cooled.

(c) Battery Cooling-Air Cooling Operation Mode

The battery cooling-air cooling operation mode is an operation mode of performing cooling of the secondary battery 53 and also air cooling of the vehicle interior at the same time by allowing the refrigerant to flow through both the interior evaporator 17 and the battery-cooling evaporator 18.

In the operation mode, the controller 40 opens both the first opening/closing valve 22a, and the second opening/closing valve 23a. Thus, the refrigeration cycle device 10 performs switching to a refrigerant circuit that allows the refrigerant to flow therethrough as indicated by thick lines and solid arrows of FIG. 3.

With the refrigerant circuit structure, the controller 40 determines the operating states of the respective various devices to be controlled connected to the output side of the controller 40 based on the detection signal from the sensor group.

Regarding the refrigerant discharge capacity of the compressor 11, a control signal to be output to the electric motor of the compressor 11 is determined based on the detection result obtained by the evaporator temperature sensor 41 such that a temperature of air blown from the interior evaporator 17 approaches the target evaporator outlet air temperature TEO, like the single air cooling operation mode.

Control signals to be output to the blower 32 of the interior air conditioning unit 30 and the air mix door 34 are determined in the same way as in the single air cooling operation mode. A control signal to be output to the blower 52 of the battery pack 50 is determined in the same way as in the single battery cooling operation mode.

Then, the control signal or control voltage is output from the controller 40 to the device to be controlled so as to obtain the control state determined in the way described above.

Figure 7:
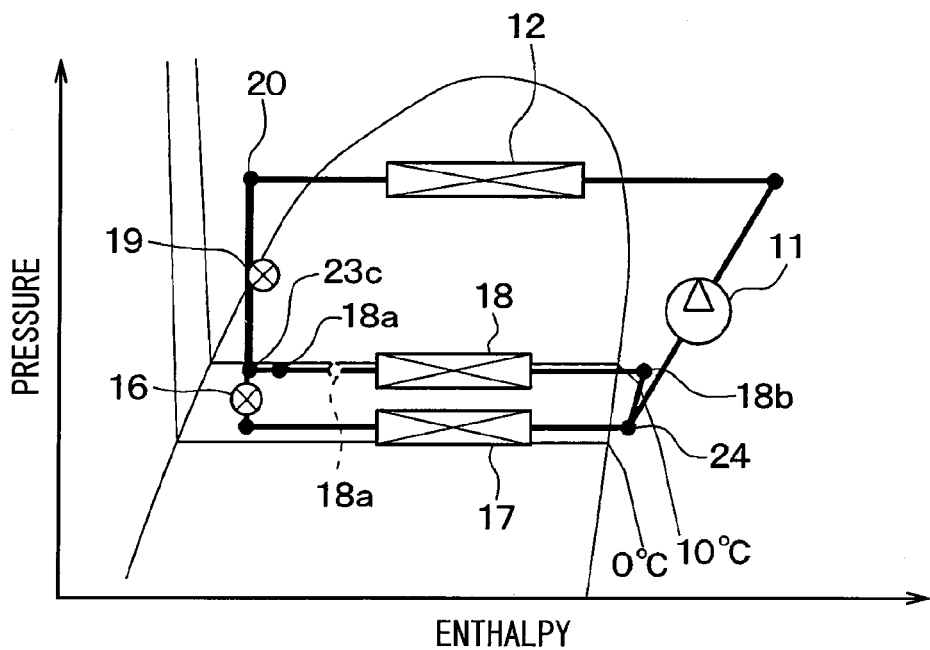
FIG. 7 is a Mollier chart showing the state of refrigerant in the battery cooling-air cooling operation mode of the refrigeration cycle device in the first embodiment.

Thus, in the refrigeration cycle device 10 of the battery cooling-air cooling operation mode, as shown in FIGS. 3 and 7, the refrigerant flows from the compressor 11 to the exterior condenser 12, the branch portion 20, the air-cooling expansion valve 16, the interior evaporator 17, the merging portion 24, and then the compressor 11 in this order, while the refrigerant flows from the branch portion 20 to the battery-cooling expansion valve 19, the battery-cooling evaporator 18, and then the merging portion 24 in this order. Note that a Mollier chart shown in FIG. 7 illustrates a refrigerant state obtained when the refrigerant flows through the interior evaporator 17, as well as another refrigerant state obtained when the refrigerant flows through the battery-cooling evaporator 18.

At this time, in the interior evaporator 17, the refrigerant decompressed by the air-cooling expansion valve 16 absorbs heat from the air for the interior blown from the blower 32 to evaporate itself, in the same way as in the single air cooling operation mode. Thus, the air for the interior is cooled, thereby achieving the air-cooling of the vehicle interior.

On the other hand, on the side of the battery-cooling evaporator 18, the refrigerant flowing out of the exterior condenser 12 is decompressed by the battery-cooling expansion valve 19 into a gas-liquid two-phase refrigerant. The refrigerant in this state flows through the inner pipe 28a of the double pipe 28, and then flows into the battery-cooling evaporator 18. The refrigerant flowing into the battery-cooling evaporator 18 absorbs heat from the battery air blown from the blower 52 to evaporate itself. In this way, the battery air is cooled, whereby the secondary battery 53 is cooled.

As shown in FIG. 4, the entire double pipe 28 is configured such that a flow-path sectional area S2 of the outer pipe 28b is smaller than a flow-path sectional area S1 of the inner pipe 28a, which increases a pressure loss generated when the refrigerant flows through the inside of the outer pipe 28b forming the second return passage 26. In this case, the refrigerant pressure and refrigerant temperature at a refrigerant outlet 18b of the battery-cooling evaporator 18 are increased, as compared to when the flow-path sectional area S2 of the outer pipe 28b is equal to or more than the flow-path sectional area S1 of the inner pipe 28a, which increases the blown air temperature at the battery-cooling evaporator 18. Using these characteristics, the refrigerant pressure at the battery-cooling evaporator 18 is kept higher than that at the interior evaporator 17, and the blown air temperature at the battery-cooling evaporator 18 is set higher than that at the interior evaporator 17.

One of methods for increasing a pressure loss of the refrigerant flowing through the second return passage 26 involves adding a decompressor, such as a fixed throttle, to the second return passage 26. However, the first embodiment does not need to add the decompressor.

In the first embodiment, the entire double pipe 28 is configured such that the flow-path sectional area S2 of the outer pipe 28b is smaller than the flow-path sectional area S1 of the inner pipe 28a. Not all but a part of the double pipe 28 may configured in such a way.

Next, the effects of the first embodiment will be described.

In the first embodiment, the battery-cooling expansion valve 19 is disposed on the side closer to the branch portion 20 than the battery-cooling evaporator 18 in the second outward passage 23.

Thus, a section of the second outward passage 23 through which the high-density liquid refrigerant flows becomes short, and a section thereof through which a low-density gas-liquid two-phase refrigerant decompressed by the battery-cooling expansion valve 19 flows becomes long, as compared to the case in which the battery-cooling expansion valve 19 is disposed near the battery-cooling evaporator 18. As a result, the amount of refrigerant existing in the second outward passage 23 can be reduced.

More specifically, if the battery-cooling expansion valve 19 is disposed near the battery-cooling evaporator 18, the liquid refrigerant passing through the branch portion 20 flows through a long section from the branch portion 20 to the battery-cooling expansion valve 19, and is then decompressed by the battery-cooling expansion valve 19 to flow into the battery-cooling evaporator 18. The density of the liquid refrigerant is 1150 kg/m$^3$ at 40° C. Thus, supposing the section from the branch portion 20 to the battery-cooling expansion valve 19 is configured of a refrigerant pipe having an inner diameter of 6 mm and a length of 5 m, the amount of refrigerant in the refrigerant pipe is 163 g when the temperature of the refrigerant is 40° C.

On the other hand, in the first embodiment, since the battery-cooling expansion valve 19 is disposed near the branch portion 20, as soon as the liquid refrigerant passes through the branch portion 20, the liquid refrigerant is decompressed by the battery-cooling expansion valve 19 into the gas-liquid two-phase refrigerant. The gas-liquid two-phase refrigerant flows through a long section from the battery-cooling expansion valve 19 to the battery-cooling evaporator 18 to flow into the battery-cooling evaporator 18. The density of the gas-liquid two-phase refrigerant is 100 kg/m$^3$ at 10° C. Thus, supposing the section from the battery-cooling expansion valve 19 to the battery-cooling evaporator 18 is configured of a refrigerant pipe having an inner diameter of 10.3 mm and a length of 5 m, the amount of refrigerant in the refrigerant pipe is 42 g when the temperature of the refrigerant is 10° C.

Thus, in the present embodiment, the amount of refrigerant in the second outward passage 23 can be significantly decreased. As a result, the sealed refrigerant amount in the entire refrigeration cycle can be decreased, and a difference in required refrigerant amount between the operation modes can be reduced.

The battery-cooling expansion valve 19 is disposed on the side closer to the branch portion 20 rather than the battery-cooling evaporator 18 in the second outward passage 23. Thus, even though a section from the battery-cooling expansion valve 19 of the second outward passage 23 to the battery-cooling evaporator 18 is constituted by a single pipe, the amount of refrigerant existing in the second outward passage 23 can be reduced like the first embodiment.

In this case, however, conversely, when the gas-liquid two-phase refrigerant flows through the single pipe, the refrigerant receives heat from the outside, which causes a new problem that the cooling performance of the battery-cooling evaporator 18 is reduced.

That is, the refrigerant pipe constituting the second outward passage 23 and the second return passage 26 is disposed under the vehicle. The influence including reflection of light from a road surface increases the temperature of the external surroundings of the refrigerant pipe to a high temperature in many cases.

Figure 8:
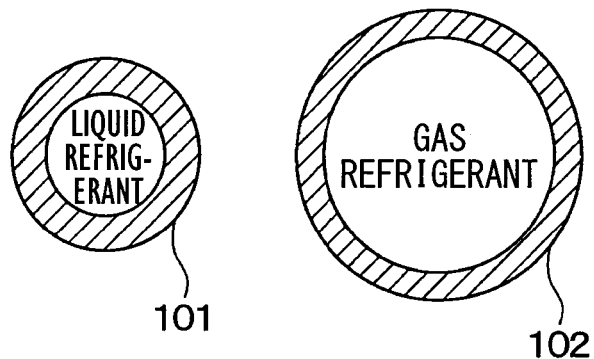
FIG. 8 is a sectional view of an outward refrigerant pipe and a return refrigerant pipe in a battery-cooling evaporator in the related art.

Like the related art, if the battery-cooling expansion valve 19 is disposed closer to the battery-cooling evaporator 18 rather than the branch portion 20, as shown in FIG. 8, the liquid refrigerant having a high temperature of, e.g., 40° C. flows through a refrigerant pipe 101 across a long section from the branch portion 20 to the battery-cooling expansion valve 19, while the gas refrigerant having a low temperature of, e.g., 15° C. flows through a refrigerant pipe 102 from the battery-cooling evaporator 18 to the merging portion 24. Thus, even when the outside temperature becomes high, for example, at 35° C., a difference in temperature between the liquid refrigerant and the outside is small. Since the received heat quantity is proportional to the temperature difference, the received heat quantity from the outside of the liquid refrigerant becomes small.

Figure 9:
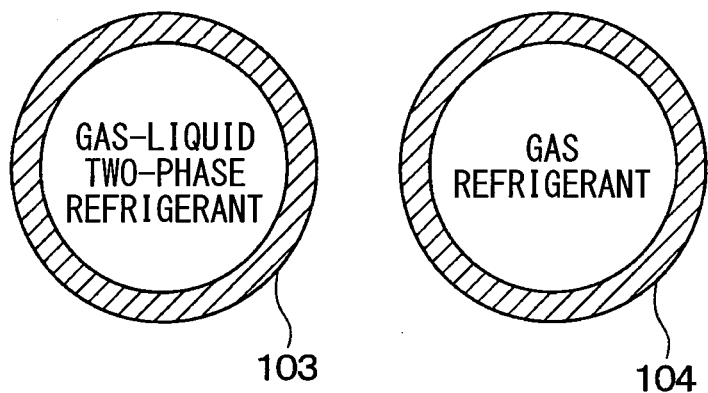
FIG. 9 is a sectional view of an outward refrigerant pipe and a return refrigerant pipe in a battery-cooling evaporator of a comparative example.

Assume that the battery-cooling expansion valve 19 is disposed closer to the branch portion 20 rather than the battery-cooling evaporator 18 in the second outward passage 23, and as shown in FIG. 9, a section from the battery-cooling expansion valve 19 to the battery-cooling evaporator 18 is constituted by a single pipe 103, while a section from the battery-cooling evaporator 18 to the merging portion 24 is constituted by another single pipe 104. In this case, the gas-liquid two-phase refrigerant having a low temperature, e.g., 10° C., flows through the single pipe 103, while a gas refrigerant having a low temperature, e.g., 15° C., flows through another single pipe 104. Thus, when an external temperature becomes high, e.g., at 35° C., a difference in temperature between the outside and the gas-liquid two-phase refrigerant flowing through the single pipe 103 becomes large, which increases the received heat quantity from the outside of the gas-liquid two-phase refrigerant.

Thus, the state of the refrigerant located at a refrigerant inlet 18a of the battery-cooling evaporator 18 corresponds to the position of a circle represented by a dashed line in Mollier charts of FIGS. 6 and 7, where a difference in enthalpy between the refrigerant inlet 18a and the refrigerant outlet 18b of the battery-cooling evaporator 18 is small to reduce the cooling performance of the battery-cooling evaporator 18.

For this reason, as shown in FIG. 4, the section 23b of the second outward passage 23 through which the gas-liquid two-phase refrigerant flows is constituted by the inner pipe 28a of the double pipe 28, while the part 26a of the second return passage 26 is constituted by the outer pipe 28b of the double pipe 28. In this way, the low-temperature gas refrigerant flowing through the outer pipe 28b serves as a heat insulator, which can suppress the reception of heat by the gas-liquid two-phase refrigerant flowing through the second outward passage 23 from the outside, as compared to the case in which the second outward passage 23 is constituted by the single pipe 103.

Thus, the state of the refrigerant located at the refrigerant inlet 18a of the battery-cooling evaporator 18 corresponds to the position of a circle filled with black color in the Mollier charts of FIGS. 6 and 7, where a difference in enthalpy between the refrigerant inlet 18a and the refrigerant outlet 18b of the battery-cooling evaporator 18 becomes large as compared to the case in which the second outward passage 23 is constituted by the single pipe 103.

Accordingly, the cooling performance of the battery-cooling evaporator 18 can be improved as compared to the case in which the second outward passage 23 is constituted by the single pipe 103.

Although in the first embodiment, the heat insulator is not wound around the double pipe 28, the heat insulator may be wound around the double pipe 28. Thus, the reception of heat by the gas-liquid two-phase refrigerant from the outside can further be suppressed. When the heat insulator is wound around the double pipe 28, a space between the inner pipe 28a and the outside air is insulated by both the low-temperature gas refrigerant flowing through the outer pipe 28b and the heat insulator around the double pipe 28. Accordingly, the amount of the heat insulator required to achieve the same insulating performance can be reduced to decrease a thickness of the heat insulator wound around the pipe, as compared to the case in which the second outward pipe 23 is constituted by the single pipe 103 with the heat insulator wound around the single pipe 103.

Second Embodiment

Figure 10:
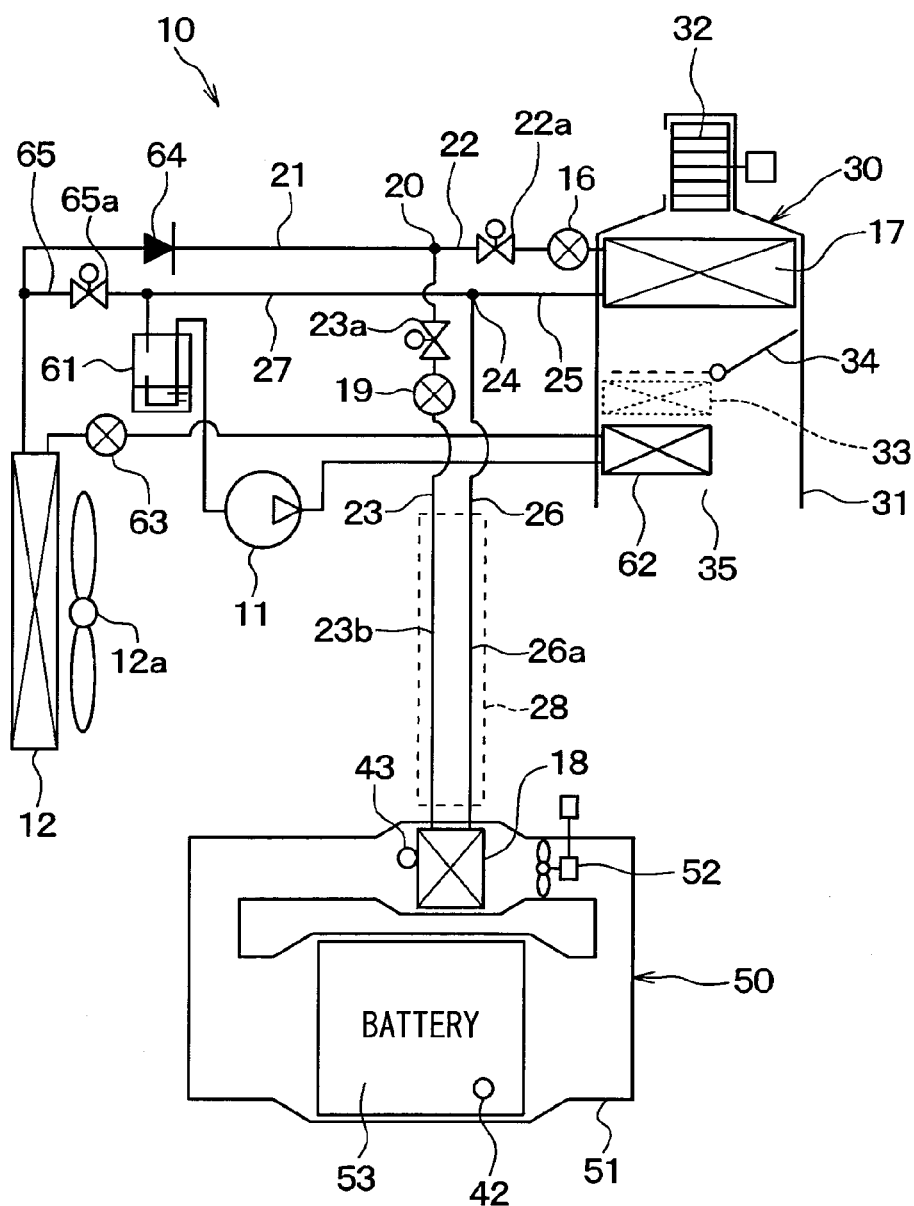
FIG. 10 is an entire configuration diagram showing a refrigeration cycle device in a second embodiment.

In the first embodiment, a receiver cycle that intends to perform air cooling is used as the basic cycle of the refrigeration cycle device 10. However, in a second embodiment as shown in FIG. 10, a heat pump cycle capable of performing both air cooling and heating is used. The structures of other components in the second embodiment are the same as those in the first embodiment.

The heat pump cycle is an accumulator cycle using an accumulator 61 instead of the gas-liquid separator 14 of the first embodiment. The heat pump cycle includes, in addition to the compressor 11, the exterior condenser 12, the air-cooling expansion valve 16, and the interior evaporator 17, an interior condenser 62, an air-heating expansion valve 63, a check valve 64 provided in the refrigerant flow path 21, and a bypass opening/closing valve 65a provided in a bypass flow path 65.

The accumulator 61 is a gas-liquid separator that separates the refrigerant, which is to be sucked into the compressor 11, into liquid and gas phases, thereby storing therein the excessive refrigerant within the cycle.

The interior condenser 62 is disposed in the casing 31 of the interior air conditioning unit 30. The interior condenser 62 is a heating heat exchanger that exchanges heat between the air for the interior and a high-pressure refrigerant discharged from the compressor 11, thereby heating air for the interior while dissipating heat from the refrigerant, when performing air heating of the vehicle interior.

The air-heating expansion valve 63 is a decompressor that decompresses the refrigerant flowing out of the interior condenser 62 when performing air heating of the vehicle interior. The air-heating expansion valve 63 is an electric expansion valve that includes a valve body whose throttle opening degree (valve opening degree) is adjustable from a completely closed state to a fully opened state, and an electric actuator adapted to change the throttle opening degree (valve opening degree) of the valve body. The air-heating expansion valve 63 has its operation controlled by a control signal output from the controller.

The bypass flow path 65 is a refrigerant flow path that allows the refrigerant flowing out of the exterior condenser 12 to be guided to the accumulator 61, while bypassing the interior evaporator 17 and the battery-cooling evaporator 18. The bypass opening/closing valve 65a is an electromagnetic valve whose opening and closing operations are controlled by a control voltage output from the controller. Switching between the presence and absence of the refrigerant flow in the bypass flow path 65 is performed by opening or closing the bypass opening/closing valve 65a.

Also, the second embodiment can exhibit the same effects as those of the first embodiment.

Although in the second embodiment, an electric expansion valve is used as the air-heating expansion valve 63, a fixed throttle, such as a capillary, may be used instead of the electric expansion valve. In this case, there are provided a bypass route that allows the refrigerant to flow bypassing the air-heating expansion valve 63, and an opening/closing valve that is adapted to open/close the bypass route. In the air cooling operation mode, the opening/closing valve is opened to allow the refrigerant to flow bypassing the air-heating expansion valve 63.

Third Embodiment

Figure 11:
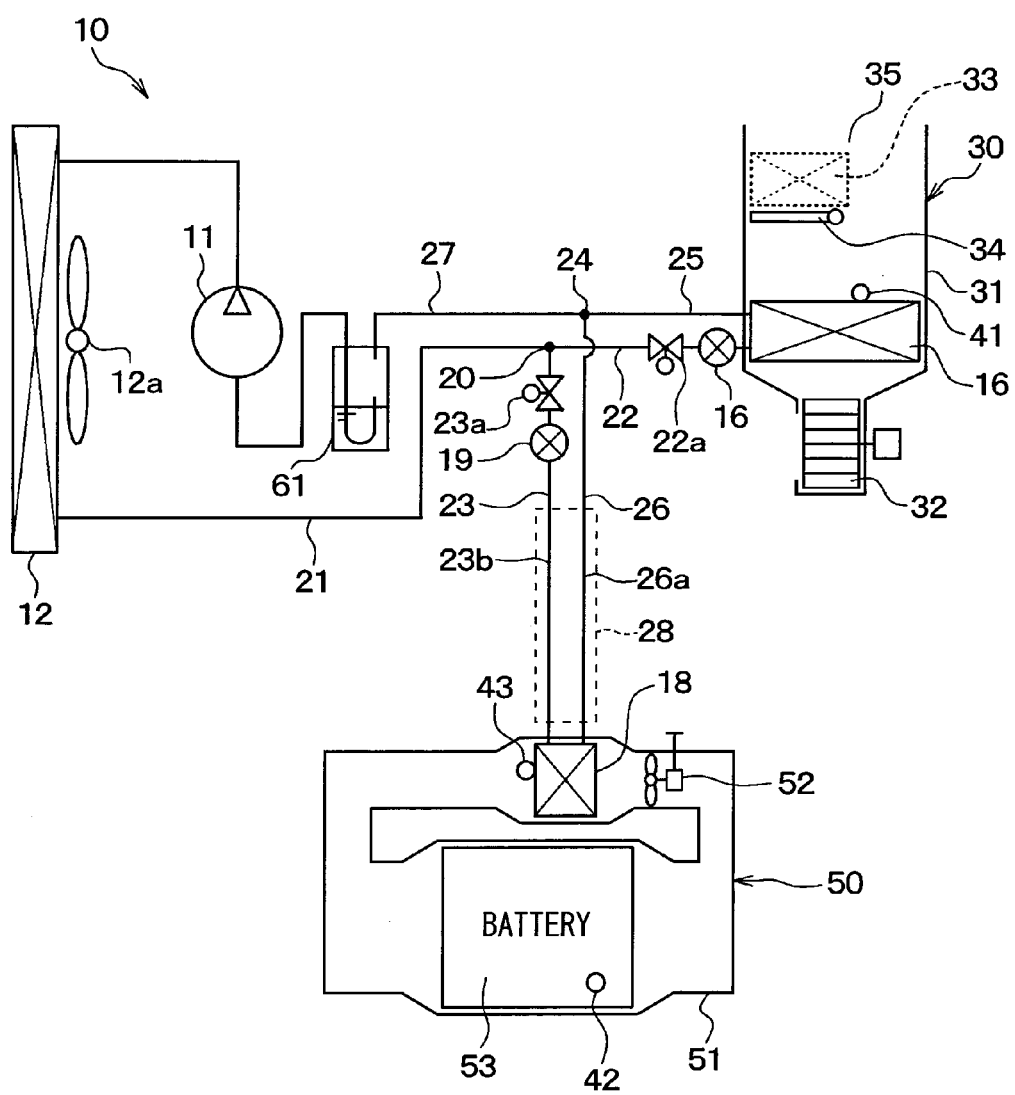
FIG. 11 is an entire configuration diagram showing a refrigeration cycle device in a third embodiment.

Although in the second embodiment, the heat pump cycle capable of performing both the air cooling and heating operations is used as the basic cycle of the refrigeration cycle device 10, a third embodiment uses an accumulator cycle that performs only an air cooling operation as shown in FIG. 11.

The accumulator cycle omits the interior condenser 62, the air-heating expansion valve 63, the check valve 64, the bypass flow path 65, and the bypass opening/closing valve 65a from the accumulator cycle shown in FIG. 10. Also, the third embodiment can exhibit the same effects as those of the first embodiment.

Fourth Embodiment

A fourth embodiment differs from the first embodiment in the structure of the double pipe 28. The structures of other components in the fourth embodiment are the same as those of the first embodiment. The fourth embodiment can also be applied to the second and third embodiments.

Figure 12:
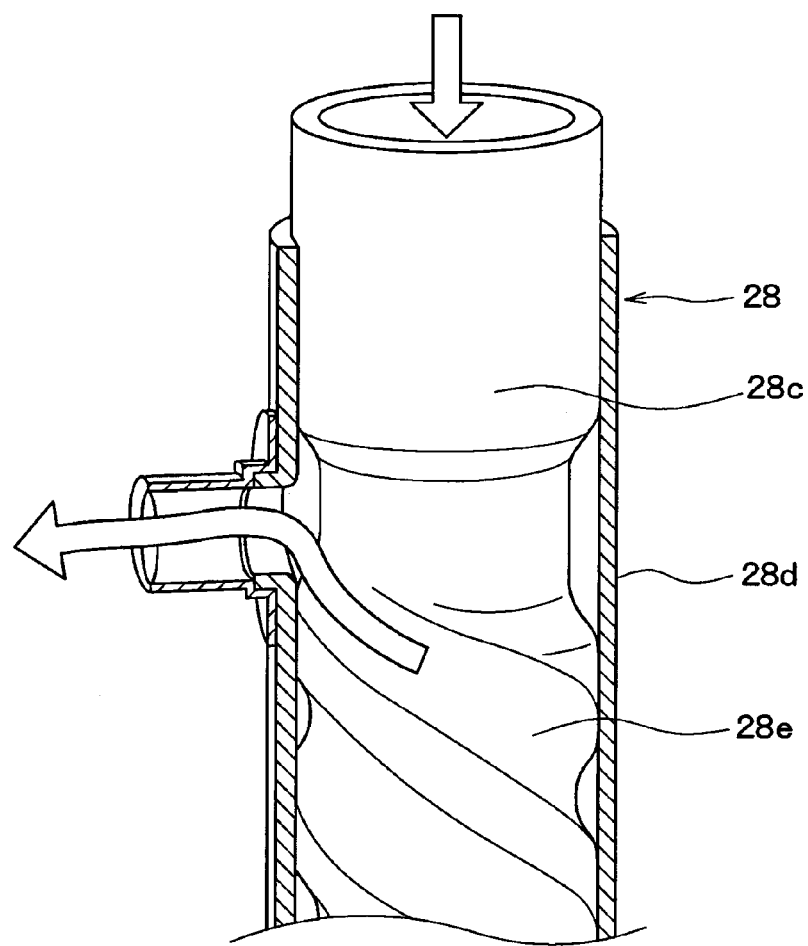
FIG. 12 is a perspective sectional view showing the structure of a double pipe in a fourth embodiment.

As shown in FIG. 12, in the fourth embodiment, a double pipe 28 with a spiral structure is used. The double pipe 28 of this embodiment is the same as the double pipe 28 of the first embodiment in that an inner pipe 28c is positioned inside an outer pipe 28d, and that the double pipe includes the inner pipe 28c and the outer pipe 28d covering the inner pipe 28c.

However, the double pipe 28 in the fourth embodiment differs from the double pipe 28 in the first embodiment in that the inner diameter of the outer pipe 28d is substantially the same as the outer diameter of the inner pipe 28c, and that a spiral groove 28e forming a refrigerant flow path is formed at the outer surface of the inner pipe 28c.

The groove 28e of the inner pipe 28c and the inner surface of the outer pipe 28d constitute the part 26a of the second return passage 26. Thus, the gas refrigerant flowing out of the battery-cooling evaporator 18 flows along the groove 28e while swirling between the outer surface of the inner pipe 28c and the inner surface of the outer pipe 28d.

Fifth Embodiment

Figure 13:
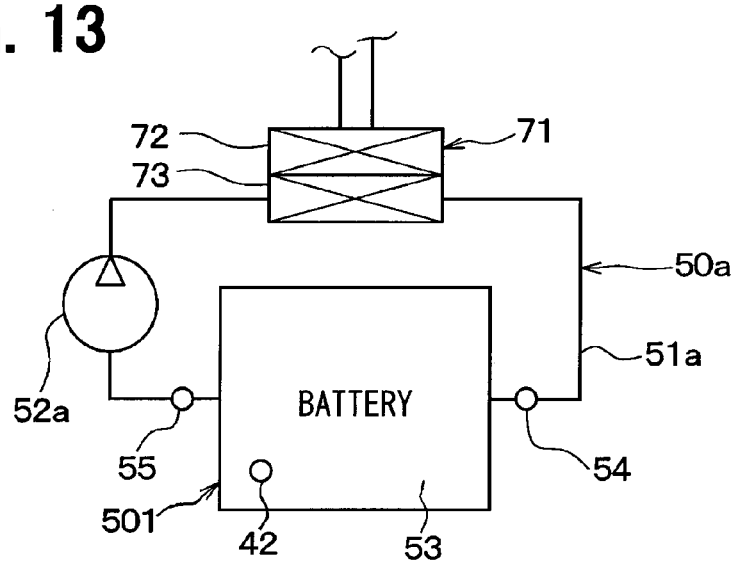
FIG. 13 is a diagram showing a cooling mechanism for a second battery in a fifth embodiment.

Although in the first to fourth embodiments, the battery-cooling evaporator 18 is a heat exchanger that exchanges heat between the battery air and the refrigerant, in a fifth embodiment, as shown in FIG. 13, a water-refrigerant heat exchanger 71 that exchanges heat between the refrigerant and a coolant adapted to cool the battery is used as the battery-cooling evaporator. The fifth embodiment can also be applied to any one of the first to fourth embodiments.

The water-refrigerant heat exchanger 71 constitutes a coolant circuit 50a together with a water pump 52a and a battery pack 501.

The coolant circuit 50a is a circuit that circulates a coolant for cooling the secondary battery 53, for example, an ethylene glycol aqueous solution. The coolant circuit 50a is configured by annularly connecting in turn the water pump 52a, a coolant passage formed inside or outside the secondary battery 53 in the battery pack 501, and the water-refrigerant heat exchanger 71 by a pipe 51a.

The water pump 52a is to pressure-feed the coolant. The water pump 52a is an electric water pump whose operation (coolant pressure-feeding capacity) is controlled by a control signal output from the controller. The water pump 52a also has its operation controlled in the respective operation modes described in the first embodiment, in the same way as the blower 52.

The water-refrigerant heat exchanger 71 is a heat exchanger that exchanges heat between the coolant and refrigerant, and which includes a refrigerant passage 72 through which the refrigerant flows, and a water passage 73 through which the coolant flows. In short, the water-refrigerant heat exchanger 71 is a heat exchanger that indirectly exchanges heat between the refrigerant and the secondary battery 53 via the coolant.

The input side of the controller is connected to an inlet side water temperature sensor 54 that detects the temperature of the coolant flowing into the coolant passage of the secondary battery 53, and an outlet side water temperature sensor 55 that detects the temperature of the coolant flowing out of the coolant passage of the secondary battery 53. For example, in the single battery cooling operation mode, the controller controls a refrigerant discharge capacity of the compressor 11 based on the temperature detected by the battery temperature sensor 42 or the inlet side or outlet side water temperature sensor 54 or 55.

Therefore, when operating the refrigeration cycle device 10 in the battery cooling-air cooling operation mode, and in the single battery cooling operation mode, the refrigerant decompressed by the battery-cooling expansion valve 19 flows into the refrigerant passage 72 of the water-refrigerant heat exchanger 71, whereby the coolant circulating through the water passage 73 can be cooled. As a result, the secondary battery 53 can be cooled.

As mentioned above, the use of the water-refrigerant heat exchanger 71 can also have the same effects as those in the first embodiment. Note that in the fifth embodiment, the coolant is used as a cooling liquid that cools the secondary battery 53, but other cooling liquids, such as oil, may be used.

Sixth Embodiment

Figure 14:
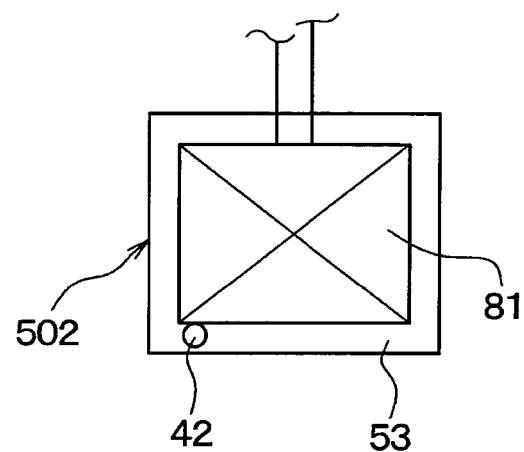
FIG. 14 is a diagram showing a cooling mechanism for a second battery in a sixth embodiment.

As shown in FIG. 14, in a sixth embodiment, a heat exchanger 81 that directly exchanges heat between the secondary battery 53 and the refrigerant is used as the battery-cooling evaporator. The sixth embodiment can also be applied to any one of the first to fifth embodiments.

The heat exchanger 81 is disposed in a battery pack 502 together with the secondary battery 53. The heat exchanger 81 is a heat exchanger that directly exchanges heat between the refrigerant and the secondary battery 53. The heat exchanger 81 is configured by a refrigerant passage formed inside or outside the secondary battery 53, for example.

Therefore, when operating the refrigeration cycle device 10 in the battery cooling-air cooling operation mode and the single battery cooling operation mode, the refrigerant decompressed by the battery-cooling expansion valve 19 flows into the heat exchanger 81 within the battery pack 502, whereby the secondary battery 53 can be cooled.

As mentioned above, even the structure that directly cools the secondary battery 53 with the refrigerant can have the same effects as those in the first embodiment.

Other Embodiments (1) Although in each of the above-mentioned embodiments, the branch portion 20 is provided apart from the exterior condenser 12, the branch portion 20 may be provided at the refrigerant outlet of the exterior condenser 12. Thus, the downstream side of the refrigerant flow in the radiator includes not only the position apart from the refrigerant outlet of the radiator, but also the refrigerant outlet itself of the radiator.

Likewise, although in each of the above-mentioned embodiments, the merging portion 24 is provided apart from the compressor 11, the merging portion 24 may be provided at the refrigerant inlet of the compressor 11. Thus, the upstream side of the refrigerant flow in the compressor includes not only the position apart from the refrigerant inlet of the compressor, but also the refrigerant inlet itself of the compressor.

(2) Although in each of the above-mentioned embodiments, the part 26a of the second return passage 26 is configured by the outer pipe 28b of the double pipe 28, the entire second return passage 26 may be configured by the outer pipe 28b of the double pipe 28.

(3) Although the respective embodiments described above use the double pipe 28 in which the flow-path sectional area S2 of each of the outer pipes 28b and 28d is smaller than the flow-path sectional area S1 of each of the inner pipes 28a and 28c, the double pipe 28 for use may be one in which both the flow-path sectional areas S1 and S2 are the same. In this case, another decompressor, such as a fixed throttle, is added to the second return passage 26, which increases the pressure loss of the refrigerant flowing through the second return passage 26. Thus, like the first embodiment, the blown air temperature of the battery-cooling evaporator 18 can be higher than that of the interior evaporator 17.

(4) Although in each of the above-mentioned embodiments, the mechanical expansion valve is used as the air-cooling expansion valve 16 and the battery-cooling expansion valve 19, an electric expansion valve may be used. In use of the electric expansion valve, the electric expansion valve that can completely close the valve opening degree of the valve body can be employed to omit the first and second opening/closing valves 22a and 23a.

(5) Although in each of the above-mentioned embodiments, the operation mode is selected by the selection switch, the controller 40 may automatically select the operation mode.

(6) In the description about each of the above-mentioned embodiments, the first object to be cooled is air for the interior to be blown into the vehicle interior, and the second object to be cooled is the secondary battery 53 by way of example. However, the first and second objects to be cooled are not limited thereto.

Alternatively, the first object to be cooled is air for the interior, and the second object to be cooled may be a component mounted on a vehicle, other than the secondary battery 53. Such components can include, for example, an internal combustion engine (engine), an electric motor, an inverter, etc.

Both the first and second objects to be cooled may be air for the interior. In this case, for example, the air for the interior to be blown to a front seat of the vehicle compartment may be cooled by the interior evaporator 17 described in the first embodiment, and the battery-cooling evaporator 18 may be used as an evaporator for a rear seat, whereby the air for the interior to be blown to the rear seat of the vehicle compartment may be cooled by the battery-cooling evaporator 18. With this structure, the air-cooling as the rear seat can be achieved using the refrigeration cycle device as a dual air conditioner. Note that the battery-cooling evaporator may cool not only the air for the interior to be blown to the rear seat, but also air for the interior to be blown to a seat other than the front seat, such as a second-row seat of three-row seats. The first and second objects to be cooled may be the air for the interior to be blown to the right and left sides of the front seat in the vehicle compartment.

The first and second objects to be cooled may be components mounted on the vehicle. Such components can include, for example, the secondary battery 53, the internal combustion engine (engine), the electric motor, the inverter, etc.

(7) In each of the above-mentioned embodiments, the refrigeration cycle device 10 constitutes the subcritical refrigeration cycle, using the HFC refrigerant or the like as the refrigerant. However, the refrigeration cycle device 10 may constitute a supercritical refrigeration cycle in which a pressure of the radiator exceeds a critical pressure of the refrigerant, using carbon dioxide as the refrigerant.

(8) In the first and second embodiments, the refrigeration cycle device 10 according to the present disclosure is applied to a hybrid vehicle that obtains a driving force for vehicle traveling from both the internal combustion engine and the electric motor. However, the refrigeration cycle device 10 may be applied to an electric vehicle that obtains the driving force for vehicle traveling from an electric motor for traveling.

Although the refrigeration cycle device 10 in the present disclosure is applied to the vehicle in each of the above-mentioned embodiments, the refrigeration cycle device 10 may be applied to any object other than the vehicle.

(9) The present disclosure is not limited to the embodiments described above, and various modifications and changes can be made to those embodiments without departing from the scope of the claims. The above-mentioned respective embodiments are not unrelated to each other, and a combination of the embodiments can be made as appropriate, except when the combination obviously appears to be impossible. Elements included in the respective embodiments are not necessarily essential, particularly, unless otherwise specified, and except when clearly considered to be essential in principle.

What is claimed is:

1. A refrigeration cycle device comprising: a compressor that compresses and discharges a refrigerant; a radiator that dissipates heat from the refrigerant discharged from the compressor; a first decompressor and a second decompressor that are arranged in parallel on a downstream side of the radiator in a refrigerant flow, the first and second decompressors being adapted to decompress the refrigerant flowing out of the radiator; a first evaporator that exchanges heat between the refrigerant decompressed by the first decompressor and a first object to be cooled, to cool the first object to be cooled and to evaporate the refrigerant; a second evaporator that exchanges heat between the refrigerant decompressed by the second decompressor and a second object to be cooled, to cool the second object to be cooled and to evaporate the refrigerant; a first outward passage and a second outward passage which are refrigerant flow paths branched from a branch portion provided on the downstream side of the refrigerant flow through the radiator, and which are adapted to guide the refrigerants from the branch portion to refrigerant inlets of the first evaporator and the second evaporator, respectively; and a first return passage and a second return passage which are refrigerant flow paths merging at a merging portion provided on an upstream side of a refrigerant flow through the compressor, and which are adapted to guide the refrigerants from refrigerant outlets of the first evaporator and the second evaporator, respectively, to the merging portion, wherein the second outward passage has a refrigerant flow path longer than that of the first outward passage, a part of the second outward passage, located on a downstream side of a refrigerant flow with respect to the second decompressor, is defined by an inner pipe of a double pipe and an outer pipe covering the inner pipe, at least a part of the second return passage is defined by the outer pipe, the second decompressor is located between the branch portion and the double pipe in the second outward passage, and wherein an intermediate portion of the inner pipe between an upper portion of the inner pipe and a groove formed on an outer surface of the inner pipe tapers inward and is located in an area coinciding with an outlet of the double pipe.

2. The refrigeration cycle device according to claim 1, wherein
a distance from the second decompressor to the branch portion is less than a distance from the second decompressor to the second evaporator.

3. The refrigeration cycle device according to claim 1, wherein
in an operation mode in which the refrigerant allows to flow through both the first and second evaporators, a flow-path sectional area of the outer pipe is smaller than a flow-path sectional area of the inner pipe in at least a part of the double pipe such that a refrigerant pressure at the refrigerant outlet of the second evaporator is higher than that at the refrigerant outlet of the first evaporator.

4. The refrigeration cycle device according to claim 1, wherein
the first object to be cooled is air for an interior to be blown into the interior of the vehicle, and the second object to be cooled is a component mounted on the vehicle.

5. The refrigeration cycle device according to claim 4, wherein
the component mounted on the vehicle is a secondary battery.

6. The refrigeration cycle device according to claim 1, wherein
the inner pipe of the double pipe includes a first refrigerant inlet and a first refrigerant outlet;
the outer pipe of the double pipe includes a second refrigerant inlet and a second refrigerant outlet;
a second refrigerant passage is defined between the inner pipe and the outer pipe; and
the inner pipe tapers inward to form an annular chamber adjacent the second refrigerant outlet, the annular chamber is in communication with the second refrigerant passage.

7. The refrigeration cycle device according to claim 6, wherein the second refrigerant passage is a spiral passage.

8. The refrigeration cycle device according to claim 6, wherein the first refrigerant inlet is in direct communication with the second decompressor.

9. The refrigeration cycle device according to claim 8, wherein the second refrigerant outlet is in direct fluid communication with the second return passage.

10. The refrigeration cycle device according to claim 9, wherein the second refrigerant passage is a spiral passage.

11. A refrigeration cycle device comprising: a compressor that compresses and discharges a refrigerant; a radiator that dissipates heat from the refrigerant discharged from the compressor; a first decompressor and a second decompressor that are arranged in parallel on a downstream side of the radiator in a refrigerant flow, the first and second decompressors being adapted to decompress the refrigerant flowing out of the radiator; a first evaporator that exchanges heat between the refrigerant decompressed by the first decompressor and a first object to be cooled, to cool the first object to be cooled and to evaporate the refrigerant; a second evaporator that exchanges heat between the refrigerant decompressed by the second decompressor and a second object to be cooled, to cool the second object to be cooled and to evaporate the refrigerant; a first outward passage and a second outward passage which are refrigerant flow paths branched from a branch portion provided on the downstream side of the refrigerant flow through the radiator, and which are adapted to guide the refrigerants from the branch portion to refrigerant inlets of the first evaporator and the second evaporator, respectively; and a first return passage and a second return passage which are refrigerant flow paths merging at a merging portion provided on an upstream side of a refrigerant flow through the compressor, and which are adapted to guide the refrigerants from refrigerant outlets of the first evaporator and the second evaporator, respectively, to the merging portion, wherein the second outward passage has a refrigerant flow path longer than that of the first outward passage, a part of the second outward passage, located on a downstream side of a refrigerant flow with respect to the second decompressor, is defined by an inner pipe of a double pipe and an outer pipe covering the inner pipe, at least a part of the second return passage is defined by the outer pipe, the second decompressor is provided in the second outward passage on a side of the branch portion with respect to the double pipe, and wherein an intermediate portion of the inner pipe between an upper portion of the inner pipe and a groove formed on an outer surface of the inner pipe tapers inward and is located in an area coinciding with an outlet of the double pipe.

12. The refrigeration cycle device according to claim 11, wherein
a distance from the second decompressor to the branch portion is less than a distance from the second decompressor to the second evaporator.

13. The refrigeration cycle device according to claim 11, wherein
the inner pipe of the double pipe includes a first refrigerant inlet and a first refrigerant outlet;
the outer pipe of the double pipe includes a second refrigerant inlet and a second refrigerant outlet;
a second refrigerant passage is defined between the inner pipe and the outer pipe; and
the inner pipe tapers inward to form an annular chamber adjacent the second refrigerant outlet, the annular chamber is in communication with the second refrigerant passage.

14. The refrigeration cycle device according to claim 13, wherein the second refrigerant passage is a spiral passage.

15. The refrigeration cycle device according to claim 13, wherein the first refrigerant inlet is in direct communication with the second decompressor.

16. The refrigeration cycle device according to claim 15, wherein the second refrigerant outlet is in direct fluid communication with the second return passage.

* * * * *